United States Patent
Rupp

(10) Patent No.: US 10,704,613 B2
(45) Date of Patent: Jul. 7, 2020

(54) ACTUATOR ASSEMBLY AND CLUTCH ASSEMBLY

(71) Applicant: GKN Automotive Ltd., Redditch, Worcestershire (GB)

(72) Inventor: Waldemar Rupp, Köln (DE)

(73) Assignee: GKN Automotive Ltd., Redditch, Worchestershire (GB)

( * ) Notice: Subject to any disclaimer, the term of this patent is extended or adjusted under 35 U.S.C. 154(b) by 0 days.

(21) Appl. No.: 16/318,515

(22) PCT Filed: Jul. 20, 2016

(86) PCT No.: PCT/EP2016/067314
§ 371 (c)(1),
(2) Date: Jan. 17, 2019

(87) PCT Pub. No.: WO2018/014950
PCT Pub. Date: Jan. 25, 2018

(65) Prior Publication Data
US 2019/0316638 A1    Oct. 17, 2019

(51) Int. Cl.
*F16D 23/12* (2006.01)
*F16D 11/10* (2006.01)

(52) U.S. Cl.
CPC .............. *F16D 23/12* (2013.01); *F16D 11/10* (2013.01); *F16D 2023/123* (2013.01)

(58) Field of Classification Search
None
See application file for complete search history.

(56) References Cited

U.S. PATENT DOCUMENTS

2005/0279601 A1   12/2005   Tuday

FOREIGN PATENT DOCUMENTS

| DE | 102008011910 A1 | 6/2009 |
| EP | 1790870 A2 | 5/2007 |
| FR | 2993949 A1 | 1/2014 |
| WO | 20151209909 A1 | 8/2015 |

OTHER PUBLICATIONS

International Search Report and Written Opinion for PCT/EP2016/067314 dated Apr. 19, 2017 (14 pages; with English translation).

*Primary Examiner* — Timothy Hannon
(74) *Attorney, Agent, or Firm* — Beijin Bieneman PLC

(57) ABSTRACT

An actuator assembly for being operated in the driveline of a motor vehicle comprises a drive unit for generating an operating force and a ramp unit drivable by the drive unit. The ramp unit comprises an abutment element, a first ring and a second ring. The first ring is drivable by the drive unit so as to rotate around a rotational axis (A) and a plurality of circumferentially distributed axial through-openings. In each of the axial through-openings two rollers are arranged of which respectively a first roller is axially supported against the abutment element and a second roller is axially supported against the second ring The second ring is configured to be held in a stationary component in a rotationally fixed and axially movable way and comprises a plurality of circumferentially distributed ramps which each cooperate with an associated roller. The ramps are configured such that rotatingly driving the rotatingly drivable first ring by the drive unit generates an axial movement of the second ring relative to the first ring. A clutch assembly can have such an actuator assembly.

16 Claims, 3 Drawing Sheets

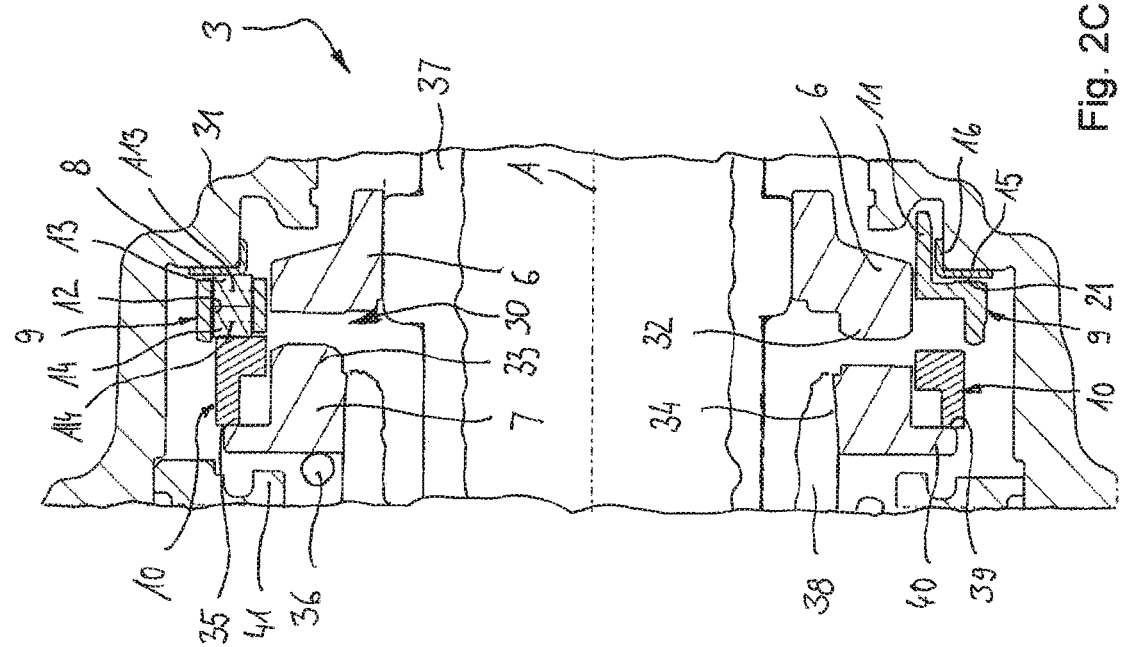
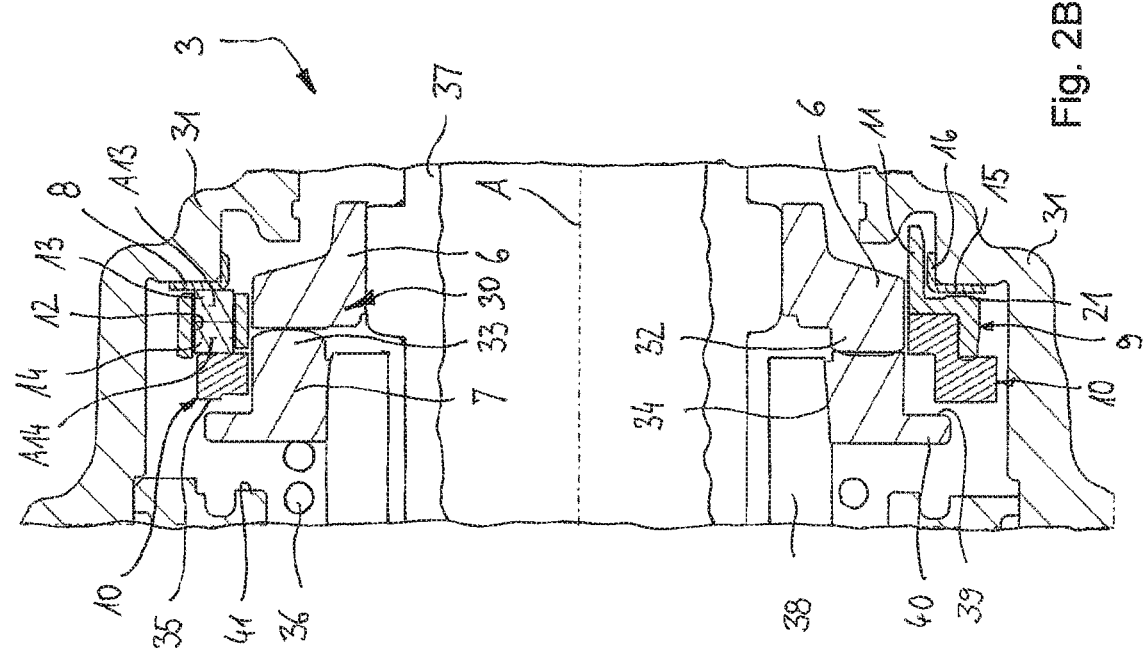

ACTUATOR ASSEMBLY AND CLUTCH ASSEMBLY

CROSS-REFERENCE TO RELATED APPLICATIONS

This application is a national stage of, and claims priority to, Patent Cooperation Treaty Application No. PCT/EP2016/067314, filed on Jul. 20, 2016, which application is hereby incorporated herein by reference in its entirety.

BACKGROUND

Drive concepts having optionally connectable and disconnectable driving axles are also referred to as "hang-on", "on demand" or "disconnect" systems. In particular, a distinction is made between the following drive concepts for motor vehicles. There are motor vehicles with a front engine, in which the front axle is permanently driven, with the rear axle being operable as required. Furthermore, there are motor vehicles having a front engine in the case of which the rear axle is permanently driven, with the front axle being operable as required. Finally, motor vehicles having a rear engine are known in the case of which the rear axle is permanently driven, with the front axle being operable by a hang-on clutch as required.

From DD 10 2008 011 910 A1 a pretensioning unit for a transmission of a motor vehicle is known which permits a friction clutch being operated in the driveline of the motor vehicle. The pretensioning unit comprises a first ramp disc, an annular cage with circumferentially distributed axial openings in which rolling elements are received, a second ramp disc with circumferentially distributed ramp contours, a second ramp disc with circumferentially distributed ramp contours, and an axial bearing. The ramp discs and the cage are form-lockingly axially held together.

WO 2015 120909 A1 proposes a clutch assembly for the driveline of a motor vehicle. The clutch assembly comprises a clutch which can drivingly connect or disconnect the first shaft and the second shaft, a brake by means of which the second shaft can be braked relative to a stationary component, and an operating device by means of which the clutch and the brake can be operated in such a way that the brake is not operated until the clutch has at least been partially opened. The operating device comprises an electric motor and a ramp assembly.

Electromotive ramp assemblies are known. The configuration of the electric motor for operating the ramp assembly depends, inter alia, on the inner friction forces of the ramp assembly.

SUMMARY

Disclosed herein is an actuator assembly for operating a clutch, in particular for the driveline of a motor vehicle, which actuator assembly has a simple and compact design and functions in a particularly low-friction way. Further, a controllable clutch assembly can have such an actuator assembly that requires only low actuating forces. Such a clutch assembly is provided for optionally connecting or disconnecting an optionally drivable driveline, which clutch assembly can be operated by a controllable actuator.

An actuator assembly for operating a clutch in the driveline of a motor vehicle, comprises a drive unit for generating an operating force and a ramp unit which is drivable by the drive unit and is configured to convert a rotational movement into a translational movement; wherein the ramp unit comprises an abutment element, a first ring, and a second ring, wherein the first ring is rotatably drivable by the drive unit about an axis of rotation and has a plurality of circumferentially distributed axial through-openings, wherein in each of the axial through-openings there are arranged two rollers axially supported against each other and in rolling contact with each other, of which a first roller is axially supported against the abutment element and a second roller is axially supported against the second ring; wherein the second ring is configured to be held rotationally fixed and axially movable in a stationary component and comprises a plurality of circumferentially distributed ramp contours which each cooperate with an associated second roller; wherein the ramp contours are configured such that rotatingly driving the rotatingly drivable first ring by means of the drive unit effects an axial movement of the second ring relative to the first ring.

An advantage of the present actuator assembly is that the second ring is axially supported via the rollers on the abutment element and is rotatably supported relative thereto. The rollers act as axial rolling contact bearings, so that, because of the rolling contact, there occur only particularly low friction forces and thus only low friction losses of the assembly. Due to the low friction forces, the drive unit, too, can be dimensioned accordingly with low nominal power, which has a positive overall effect on the required construction space and weight of the unit. There is no need for a separate axial bearing for axially supporting the first ring. The first ring has the function of a cage in which the rolling elements are rotatably received. The first ring does not participate in the axial power transmission, but merely transmits a rotary motion introduced by the drive source to the rolling elements. When operating the ramp assembly, i.e. rotating the first ring, the first rolling elements roll along the abutment element, the second rolling elements roll on the ramps of the second ring, and both rollers roll against one another. The abutment element, in particular, comprises a planar radial supporting face against which the first rolling elements are axially supported. The abutment element can be a separate abutment disc which is held in a clutch housing or transmission housing. Alternatively, the clutch housing or the transmission housing itself can constitute the abutment element or form same. A separate abutment disc made of a steel material for example is particularly advantageous if the clutch housing or the transmission housing is made of an aluminium material.

Per pocket there can be provided exactly two rolling elements, so that the second ring and the abutment element remain rotationally stationary relative to one another in the direction of rotation, i.e., they do not carry out a rotational movement relative to one another. Overall, the actuator assembly has a double function, i.e., that of an axial rolling contact bearing and that of a rotation-translation convertor, wherein at the same time the assembly comprises a simple and compact design.

In particular, the two rings are arranged axially adjacent to each other. The second ring can comprise at least two circumferentially distributed ramps each of which axially supports a rolling element. This results in good guiding and supporting conditions for the second ring at the abutment element. The at least three ramps each extend along at least 120° around the rotational axis. It is also possible to provide more than three ramps such as four, five or more. With an increasing number of rolling elements and a correspondingly increasing number of ramps, the individual surface load decreases. Accordingly, the circumferential extension of the individual ramps is shortened.

According to an embodiment, the ramps of the second ring are configured such that a first end position is defined in which the second ring is axially close or adjacent to the first ring, and a second end position in which the second ring is axially further away from the first ring. At least one of the two end positions, i.e., the first end position and/or the second end position, can be achieved by accordingly forming the ramp contour, for example by providing an engagement recess in which the associated second rolling element assumes a defined end position.

The ramp contours of the second ring can be further configured such that along the relative rotational path between the first end position and the second end position, an intermediate position is provided in such a way that in the intermediate position the second ring is held at a defined axial distance from the first ring. This should also apply when the drive unit is deactivated. The advantage is that a certain function can be assigned to the intermediate position of the ramp unit, which can be maintained without applying an external force.

The ramps of the second ring can each comprise a first portion with a first gradient and a second portion with a second gradient, wherein between the first portion and the second portion a deepened intermediate portion is formed which defines the intermediate position. The gradients of the first portion and of the second portion are in principle freely selectable and can be configured to meet design requirements. In particular, the gradient of the first portion can be smaller than, greater than, or equal to the gradient of the second portion. It is also possible that at least one of the portions, i.e., the first and/or the second portion of the respective ramp, comprises a variable gradient over the circumference. In an alternative design, the intermediate portion can also have a straight course without a gradient. This reduces the necessary force required for rotating the second ring if the intermediate position is to be left. In particular if the drive unit and the further elements comprise sufficiently friction to prevent an unintended rotation in the intermediate position due to vehicle vibrations, an intermediate portion without a gradient may be sufficient.

The ramps may have a rising run-out in the region of the first end position, i.e., in the axially close position. A rising run-out permits a further rotation of the second ring relative to the first ring beyond the end position to a limited extent, so that the entire rotating mass of the drive unit is cushioned when overshooting beyond the end position. The gradient and circumferential length of the run-out is configured in such a way—when using the actuator for loading the clutch in the closing sense—the clutch remains in the closed position even if the balls run into this region and the two rings axially move slightly away from each other again.

According to an embodiment, the first and the second rollers are provided in the form of cylindrical rollers. However, it is also conceivable that the first and the second rollers are configured to be convex or in the form of tapered rollers. Each two cylindrical rollers jointly form a pair which is positioned in one of the through-openings of the first ring. In particular, the cylindrical rollers are arranged axially adjacent to each other in a common longitudinal plane. The first roller is rotatable around a first roller axis and the second roller is rotatable around a second roller axis, with the first and the second roller axis extending parallel relative to one another and radially to the rotational axis of the first ring. In accordance with the cylindrical shape of the roller members, the ramps can be provided in the form of planar ramp faces on which the second roller members are axially supported and in rolling contact.

According to a first possibility, the first and the second rolling elements can each be arranged loosely with play in the through-openings. The radial play and the play in the circumferential direction can be kept as small as possible to avoid any unwanted noise. According to a second possibility, at least one of the first and second roller of each pair could be rotatably supported about the roller axis in the associated through-opening by means of a bearing. For this purpose, the rolling element could comprise suitable bearing journals at its axial ends, which bearing journals would be received in corresponding radial recesses of the first ring.

According to an embodiment, the first ring can have a planar radial face on its side facing the abutment element, wherein the first rollers axially projects from this radial surface in the mounted condition. Alternatively or additionally, the first ring can have a plurality of axial projections on its side facing the second ring, in each of which one of the through-openings is provided. In other words, the receiving chambers for the rolling elements can be formed in corresponding circumferentially distributed bearing regions which extend towards the second ring. Said bearing regions radially project relative to a, in particular planer, radial face of the second ring. To ensure an easy mounting procedure it can be proposed that the receiving chambers for the rolling elements are tapered towards an axial end, so that the rolling elements project beyond the axial ends of the bearing regions, but cannot fall out of same.

The first ring is rotatingly drivable by the drive unit about the rotational axis, whereas the second ring is secured against rotation and is axially displaceable. The anti-rotation support can be provided, for example, against a stationary housing in which the ramp unit is mounted. To prevent rotation, the second ring can have suitable anti-rotation elements, for example several radial projections, to hold the second ring in a rotationally fixed and axially displaceable way in a stationary component.

According to a possible design, the drive unit comprises a controllable actuator and a power transmitting device for transmitting the power generated by the drive source to the ramp unit. The power transmitting device comprises a driving pinion rotatingly drivable by the drive source and a toothing fixed to the first ring, which toothing is engaged by the driving pinion.

At least one spring element is provided which acts against the axial direction of movement generated by the drive unit, i.e., it loads the second ring towards the first ring. To that extent, the spring element can also be referred to as a return spring.

According to a possible design, at least one of the rings, i.e., the first ring and/or the second ring, can be configured so as to be undercut-free in the axial direction. An axially undercut-free contour makes it possible to produce the respective ring in an easy and cost-effective way, for example by pressing, embossing or sintering.

Further disclosed is a clutch assembly for a driveline of a motor vehicle, comprising a disconnect clutch for disconnecting the driveline and an actuator assembly which is configured according to at least one of the above embodiments. The disconnect clutch comprises at least a first clutch part and a second clutch part, wherein a spring element is provided which loads the disconnect clutch into a closed position in which torque is transmittable between the first clutch part and the second clutch part; wherein the ramp unit is arranged to load the disconnect clutch in an open position; wherein the second ring cooperates with one of the first or the second clutch part to disengage same upon actuating the drive unit.

The clutch assembly is advantageous in that only a small amount of power is required for operating same so that the drive unit of the ramp assembly, too, in respect of its nominal power, can be given small dimensions, which has an advantageous effect on the required space and the weight.

The assignment of the axial end positions of the ramp assembly to the switching positions of the clutch can be such that the first end position of the ramp assembly, in which the two rings are close to each other, defines the closed position of the clutch. Accordingly, the second end position of the ramp assembly, in which the two rings are distant from each other, defines the open position of the disconnect clutch. A torque introduced by the drive unit into the rotatingly drivable ring causes the ramp unit to move apart against the force of the spring element which, accordingly, stores potential energy. When the drive unit is actuated, the axially movable second ring is moved in a first axial direction, while the spring means load the axially movable ring in the opposed second axial direction.

According to an embodiment, the clutch can be configured as a form-locking clutch. This means clutches in which torque is transmitted by form-locking engagement of at least two clutch parts. Examples of form-locking clutches are claw clutches, sliding muff clutches or tooth clutches. By closing the clutch it is achieved that an input part connected to the first clutch part and an output part connected to the second clutch part rotate jointly, whereas in the open condition they freely rotate relative to each other. Alternatively, the clutch can also be designed in the form of a friction clutch, which for torque transmission has at least one pair of friction faces effective between the first clutch part and the second clutch part. As an example of a friction clutch, a friction disc clutch is mentioned here in particular which comprises first friction discs connected to the first clutch part in a rotationally fixed and axially movable manner and second friction discs which are connected to the second clutch part in a rotationally fixed and axially movable manner. The rotary motion between the two clutch parts is equalized by axially acting on the plate pack formed by the first and second friction discs. A friction clutch enables the transmittable torque to be adjusted variably as required, since any intermediate positions between the closed position, in which the two clutch parts rotate together, and the open position, in which the two clutch parts rotate freely against each other, can also be set. In both embodiments the clutch can be generally loaded in the closed position, with the clutch being disconnected by an external actuator. With this design, the clutch can also be referred to as a disconnect clutch. However, it is understood that a kinematic reversal is also possible, i.e., that the clutch is loaded by the ramp assembly in the closing sense.

According to a further embodiment, a brake unit can be provided for braking a driveline portion connected to the first or the second clutch part. The brake unit is operated by the ramp assembly, in particular by means of the second gradient portions of the second ring. The brake unit can comprise a first brake part firmly connected to the movable clutch part and a second brake part which is connected to a stationary component. The two brake parts are moved into friction contact with each other by moving apart the ramp unit, wherein optionally one or several friction discs can be arranged between the brake parts. By generating a friction locking effect between the brake parts, the axially movable clutch part is delayed up to the point of standing still. As a result, all the driveline parts drivingly connected to the clutch part stand still.

A method of controlling the clutch assembly can comprise the following steps: opening the form-locking clutch by actuating the drive unit in a first operating direction, wherein the axially movable ring is moved at least into the intermediate position; braking the driveshaft connected to the second clutch part when the first clutch part and the second clutch part are disengaged by moving the axially movable ring beyond the intermediate engagement position away from the axially supported ring; deactivating the drive unit, wherein the axially movable ring is held in the intermediate engagement position at a distance relative to the axially supported ring, so that the form-locking clutch remains open; closing the form-locking clutch by operating the drive unit in an opposite second operating actuating direction, wherein the axially movable ring is moved out of the intermediate engagement position and is loaded by the return spring in direction towards the axially supported ring.

The above-described clutch assembly with a ramp unit generates only low friction forces during operation and has a low hysteresis. The clutch assembly thus permits very simple control by a relatively small electric motor which requires only low drive torques to provide comparable axial forces.

The aforementioned clutch assembly can be used particularly in the driveline of a motor vehicle to interrupt torque transmission to an optionally drivable driving axle, if required (disconnect principle). According to a possible embodiment, the clutch assembly can be integrated in a take-off assembly (power take-off unit, PTU) or a transfer case.

SUMMARY OF THE DRAWINGS

Example embodiments will be described below with reference to the Figures, wherein

FIG. 2B shows the clutch assembly with the actuator assembly according to FIG. 1 in a longitudinal section in a closed position; and FIG. 2C shows the clutch assembly with the actuator assembly according to FIG. 1 in a longitudinal section in an open position.

DESCRIPTION

Figure 1A:
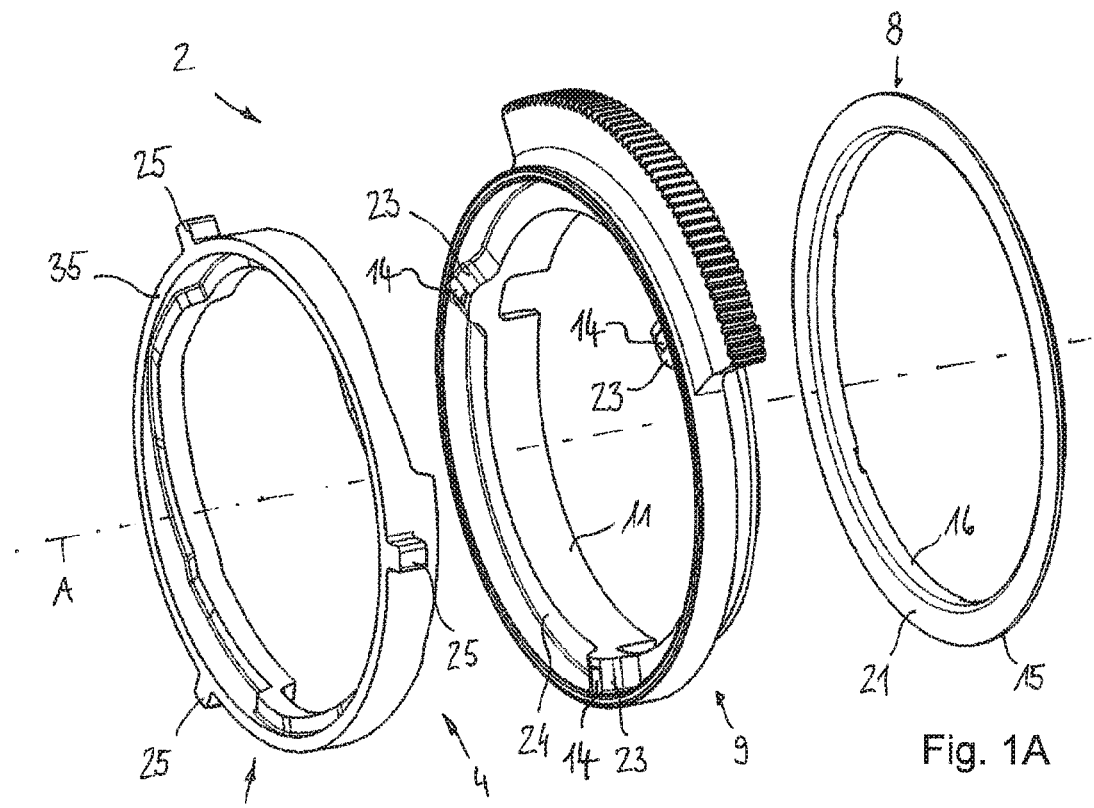
FIG. 1A shows an actuator assembly in a first perspective exploded view.
Figure 1B:
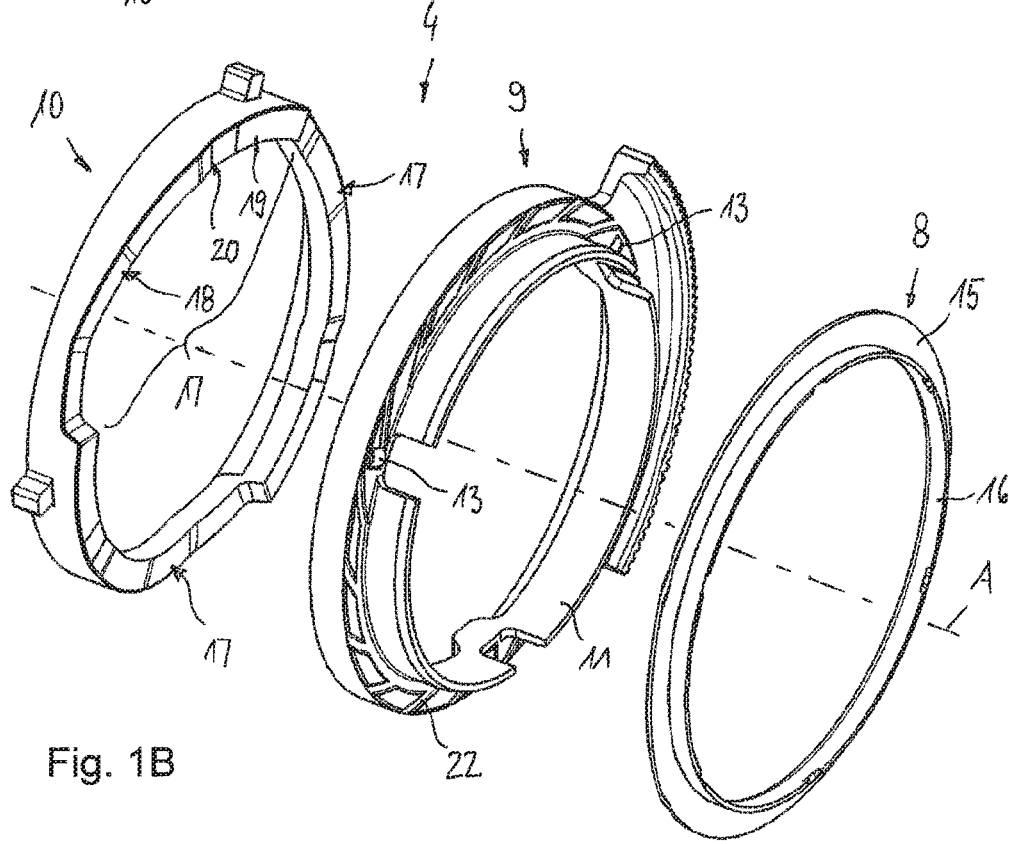
FIG. 1B shows the actuator assembly in a second perspective exploded view.
Figure 1C:
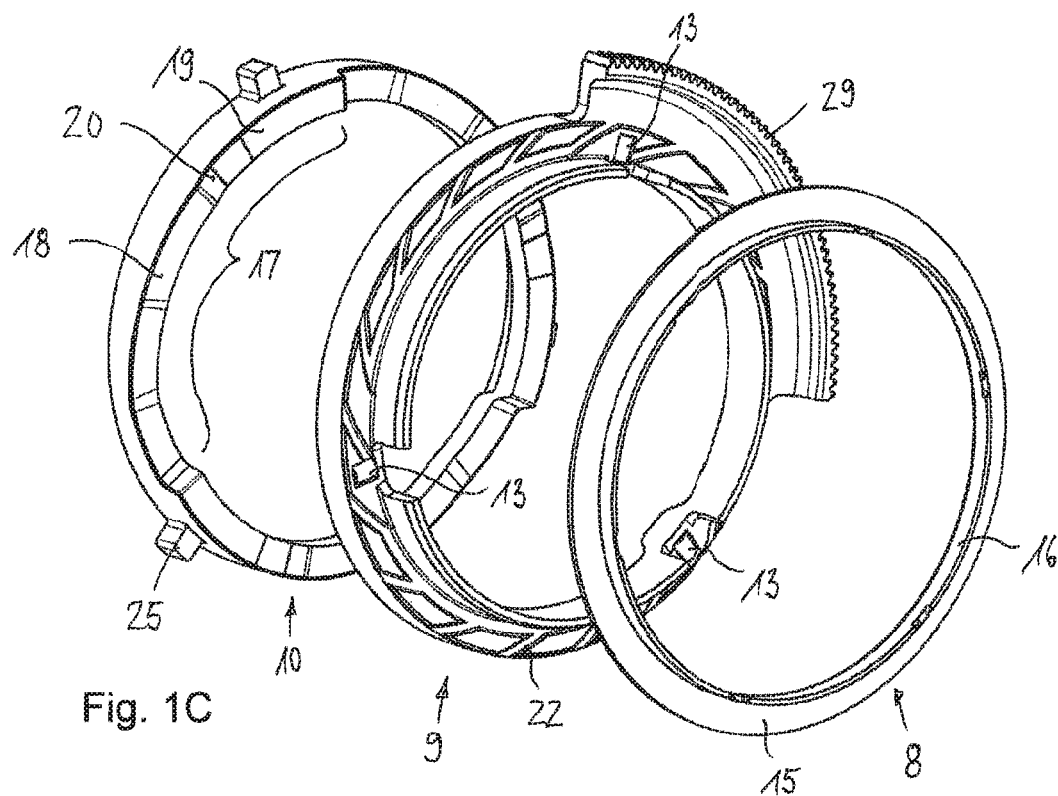
FIG. 1C shows the actuator assembly in a third perspective exploded view.

FIGS. 1A to 1C and 2A to 2C are described jointly below. FIGS. 1A to 1C show an actuator assembly having a ramp unit 4 and a controllable drive unit 5 for controlling the ramp unit 4. The actuator assembly 4 serves in particular for operating a clutch 3 in the driveline of a motor vehicle, which clutch 3 comprises a first clutch part 6 and a second clutch part 7 which can be transferred at least into a closed position and an open position.

The ramp unit 4 comprises an abutment element in the form of an abutment disc 8, a first ring 9 and a second ring 10. The first ring 9 is rotatably drivable about a rotational axis A by the drive unit and comprises several axial through-openings 12 distributed over the circumference. Two rolling contact members 13, 14, which are supported against each other in axial direction and together form a pair, are received in each of the axial through-openings 12. The rolling contact members 13, 14, which are also referred to as rollers for short, are configured in the form of cylindrical rollers. The rollers are arranged axially adjacent to each other in a common longitudinal plane, which corresponds in the upper half of FIG. 2B to the drawing plane. The first roller 13 is rotatable around a first roller axis A13 and the second roller 14 is rotatable around a second roller axis A14. In particular in FIG. 2B it can be seen that the two roller axes A13 and A14 extend parallel relative to one another and radially relative to the rotational axis A of the first ring 13.

Each first rolling element 13 is axially supported against the abutment disc 8 and is in rolling contact with same. Specifically, the abutment disc 8 comprises a flange portion 15 that forms a preferably planar radial supporting face 21 against which the first rolling elements 13 are supported. When rotating the first ring 9 around the rotational axis A, the first rolling elements 13 roll on the supporting face 21 of the abutment disc 8, and each rotate about their individual roller axes A13. Furthermore, the abutment disc can comprise a sleeve portion 16 which, in particular, for the purpose of centring the abutment disc 8, can embrace a shoulder of a stationary housing 31. The abutment disc 8 is produced out of a wear-resistant material, in particular, a steel material.

The second roller 14 is axially supported against the first roller on one side and against the second ring 10 on the other side. In this way, the second ring 10 is directly axially supported via the pair of rollers 13, 14 against the abutment disc 8. The pairs of first and second roller elements 13, 14 each sit loosely with clearance in the through openings 12. The radial clearance and circumferential clearance are as small as possible in order to avoid unwanted noises.

In particular, the first ring 9, on its side facing the abutment ring 8, comprises a planar radial face 22, wherein the first rollers 13 in the mounted condition, radially project relative to the radial face 22. On its side facing the second ring 10, the first ring 9 comprises a plurality of axial projections 23 or thickened regions in which the through-openings 12 are formed. Said thickened bearing regions in which the rolling elements 13, 14 are received point towards the second ring 10 and radially project from an, in particular flat, radial face 24 of the second ring 10.

Overall, the first ring 9 has the function of a cage in which the rolling elements 13, 14 are rotatably received. The first ring 9 transmits a rotational movement introduced by the drive source to the rolling elements 13, 14 which jointly rotate with the first ring 9 around the rotational axis A. The first ring 9 does not participate in the axial transmission of force between the second ring 10 and the abutment disc 8 via the rolling elements 13, 14. When operating the ramp assembly, with the first ring 9 being rotated, the first rolling elements 13 roll on the abutment disc 8, the second rolling contact members 14 roll on the first rolling elements 13 and the ramp faces of the second ring roll on the second rolling elements 14.

The second ring 10 is coaxially arranged relative to the first ring 9 and configured so as to be held in a rotationally fixed and axially movable way in a stationary component, for example a clutch housing or a transmission housing 31. For this purpose, the second ring 10 comprises corresponding anti-rotation means which, in the present embodiment, are formed by a plurality of circumferentially distributed radial projections 25. The radial projections 25 can engage corresponding guiding grooves in a housing 31, so that the second ring 10 is held in the housing in a rotationally fixed and axially movable way.

The second ring 10 comprises a plurality of circumferentially distributed and circumferentially extending ramps 17 which each cooperate with an associated second roller 13. The contours of the ramps 17 are such that if the first ring 9 is rotatingly driven by the drive unit 5, there is generated an axial movement of the second ring 10 relative to the first ring. Specifically it is provided that the ramps comprise at least one partial portion having an axial gradient component. As a result of the axial gradient, the rolling contact members 13, 14 roll along the ramps 17 when the second ring 19 is rotated relative to the first ring 9, so that the second ring 10 is axially moved relative to the first ring 9.

In the present embodiment, exactly three ramps 17 are provided, which are distributed regularly over the circumference and each extend in the circumferential direction over less than 120°. To ensure that the second ring 10 always remains in its parallel position relative to the first ring 9 when actuated, the ramps 17 all have the same design. Furthermore, the ramps are configured such that a first end position is defined, in which the second ring 10 is close to the first ring 9 so that the rings 9, 10 have the smallest axial distance from one another, as well as a second end position in which the second ring 10 is axially spaced from the first ring 9 or, respectively, in which the two rings 9, 10 comprise the greatest axial distance from one another.

Starting from the deepest position which defines the first end position, the ramps 17 comprise a first portion 18 with a first gradient, as well as a second portion 19 with a second gradient. The gradient of the second portion 19 is slightly smaller than the gradient of the first portion 18, and it is understood that the gradients depend on the technical requirements and can also have any other design. Between the first portion 18 and the second portion 19 an intermediate portion 20 is provided which defines an engagement position. In the engagement position, i.e. when the second rollers 14 are positioned in the intermediate portions 20, the two rings 9, 10 are held at a defined axial distance from one another. This embodiment with engaging intermediate portions 20 enables the clutch 3 to assume an intermediate position with a defined axial distance between the fully closed position and the fully open position. The contour of the intermediate portions 20 is such that the two rings 9, 10 are automatically held in the intermediate position, even if the drive unit 5 is deactivated and possibly, in spite the application of force of the second ring 10 in direction of the first ring 9 by means of a spring.

The drive unit 5 for the ramp unit 4 is configured for rotatingly driving the first ring 9, so that the latter is rotated relative to the first ring 9. The drive unit 5 comprises a controllable drive source 26 and a power transmitting device 27 for transmitting a power generated by the drive source 26 to the ramp unit 4. The drive source 26 is provided in the form of an electric motor, in particular in the form of a direct current motor. The electric motor can be controlled by an electronic control unit (ECU) (not shown).

The power transmitting device 27 comprises a drive part 28 which, in the present embodiment, is designed as a drive pinion and engages an outer toothing of the first ring 9 for torque transmission. Driving the first ring 9 causes a relative rotation relative to the second ring 10 held in a rotationally fixed way, so that the second rolling elements 14 run along the ramps 17 into deeper regions, with the second ring 10 being axially displaced away from the first ring 9. For returning the second ring 10 towards the first ring 9, a spring 36 is provided which exerts a preload force to the second ring 10 towards the first ring 9.

Figure 2A:
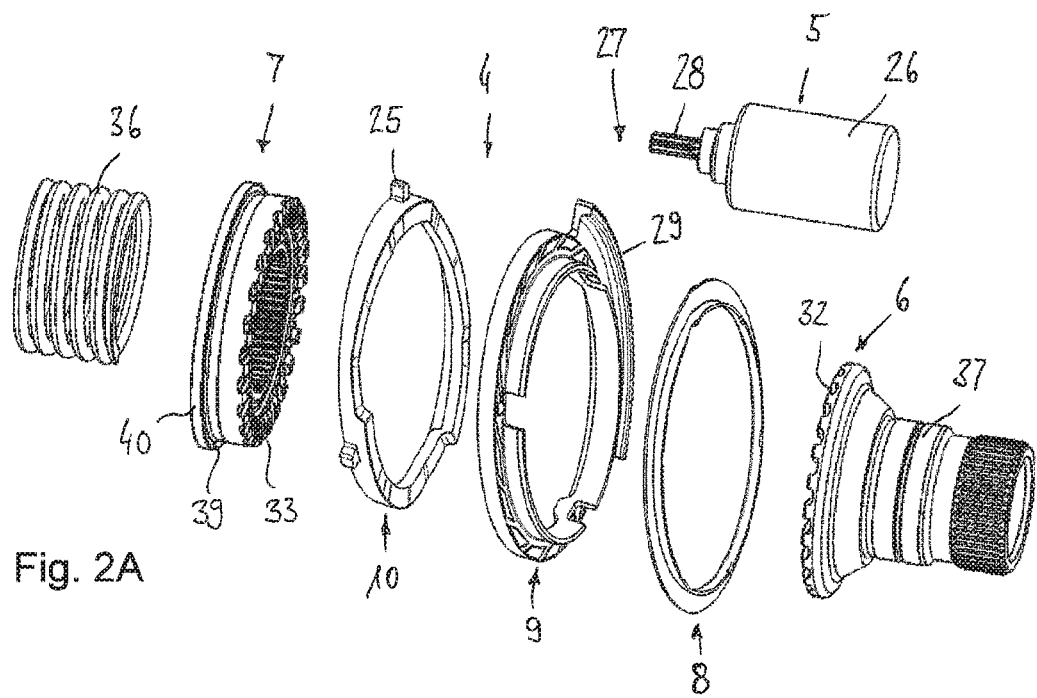
FIG. 2A shows a clutch assembly with the actuator assembly according to FIG. 1 in a perspective exploded view.

FIGS. 2A to 2C show a clutch assembly 30 having a clutch 3 and an exemplary ramp assembly 6 for operating the clutch 3.

The clutch 3 is provided in the form of a form-locking clutch and can also be referred to as a disconnect clutch, wherein the first clutch part 6 has a first engagement profile 32 at one end face, which in the closed position of the clutch 3 engages a corresponding second engagement profile 33 of the second clutch part 7 for torque transmission. The engagement profiles 32, 33 of the first and of the second clutch part 6, 7 are provided in the form of face toothings. FIG. 2B shows the clutch 3 in a closed position in which the second clutch part 7 is close the first clutch part 5, so that the engagement profiles of the clutch parts engage one another for torque transmission. In FIG. 2C the second clutch part 7 is moved away from the first clutch part 6 and is in the open position in which the engagement between the two clutch parts 6, 7 is interrupted. In this position, the second clutch part 7 is axially displaced relative to the first clutch part 6, so that the two clutch parts 6, 7 can freely rotate relative to one another, i.e. the transmission of torque is interrupted.

The first clutch part 6 can be connected to a driveshaft 37 in a rotationally fixed and axially fixed way, for example by splines and a sealing ring, or it can be produced so as to be integral with the driveshaft. The first ring 9 with its sleeve-shaped centering portion 11 is centred on an outer face of the first clutch part 6. The second clutch part 7 is ring-shaped and comprises inner splines 34 which can be engaged with an attaching component 38 for torque transmission.

The ramp assembly 4 is configured to open the clutch 3, whereby it is to be understood that it can also be configured to close a clutch according to an alternative embodiment. The drive unit 5 of the ramp assembly 4 acts accordingly in the opposite direction to the spring 36 which axially loads the two clutch parts 6, 7 into the engaging position. A first spring end is axially supported on the second clutch part 7, whereas a second spring end can be axially supported on an axially non-displaceable component.

The second ring 10 comprises a supporting face 35 against which the second clutch part 7 is axially supported with a contact face 39. For this purpose, the second clutch part 7 comprises a collar or radial projection against which the second ring 10 is axially supported. Starting from the closed position of the clutch 3, actuating the drive unit 5 causes the second ring 10 to move axially away from the abutment disc 8 and from the first ring 9, respectively. Accordingly, the second ring 10 loads the second clutch part against the pretensioning force of the spring 36 away from the first clutch part 6, so that the clutch 3 is opened. The clutch 3 is closed again by de-activating the drive unit 5, respectively at least briefly operating the drive unit 5 in the opposite direction out of the intermediate position. The clutch 3 is closed by the spring 36 which, again, loads the second clutch part 7 towards the first clutch part 6.

In addition to the functions of connecting and disconnecting a driveline by means of the clutch 3, the present clutch assembly 2 can carry out a further function, in particular braking a driveline portion connected to the second clutch part 7. For this purpose, a brake unit (not shown) may be provided having a first brake part which is fixedly connectable to the second clutch part 7, as well as a second brake part which is fixedly connectable to the stationary housing. By axially loading the second clutch part 7 away from the first clutch part 6, the brake part 40 which is connected to the second clutch part, and jointly rotates therewith, is loaded against the stationary brake part 41. The friction locking effect between the brake parts causes the first brake part to be delayed until it stands still. This means that all driveline parts which are drivingly connected to the brake part 40 stand still.

In the first end position of the drive unit 5, the second rolling elements 14 are at the deepest point of the first portion 18 of the setting contour, so that the two rings 9, 10 are axially close to each other. In this switched position which is shown in FIG. 2B, the clutch is closed (connect mode). By relatively rotating the first ring 9 in the first direction of rotation, the second balls 14 move along the first gradient portion 18, so that the second ring 10 is axially loaded away from the first ring 9, and the second clutch part 7 on which the second ring 10 is axially supported is loaded away from the first clutch part 6, so that the clutch 3 is opened. A completely open condition is achieved when the second rolling elements 14 have each reached the intermediate portions 20. In this condition, which is shown in FIG. 2C, the clutch 3 and, if provided, the brake is open. This condition can also be referred to as the free-running condition (disconnect mode). By further rotating the first ring 9 in the first direction of rotation beyond the disconnect condition, the second ring 10 together with the second clutch part 7 and the brake part 40 connected thereto is loaded towards the second brake part 41. This is achieved by the second rolling elements 14 rolling along the second gradient portions 19, wherein the two brake parts 40, 41 come into friction contact with each other, so that the rotating brake part 40, together with the components drivingly connected thereto, are braked relative to the stationary housing 34. In this braking condition (brake mode), the driveshaft 38 connected to the clutch part 7 stands still and does not transmit any torque. By configuring the ramp assembly 4 in the described way it is ensured that the brake 40, 41 is not closed until the clutch 3 is fully open.

LIST OF REFERENCE NUMBERS 2 actuator assembly
3 clutch
4 ramp unit
5 drive unit
6 first clutch part
7 second clutch part
8 abutment disc
9 first ring
10 second ring
11 centring portion
12 through-opening
13 first rolling element
14 second rolling element
15 flange portion
16 sleeve portion
17 ramp
18 first portion
19 second portion
20 intermediate portion
21 supporting face
22 radial face
23 projection
24 radial face
25 anti-rotation elements
26 drive source
27 force transmitting device
28 drive part
29 outer toothing
30 clutch assembly
31 housing 32 engagement profile
33 engagement profile
34 splines
35 supporting face
36 spring
37 drive source
38 attaching component
39 contact face
40 first brake part
41 second brake part
A rotational axis

The invention claimed is:

1. An actuator assembly for operating a clutch in the driveline of a motor vehicle, comprising:
   a drive unit for generating an operating force; and
   a ramp unit which is drivable by the drive unit and which comprises an abutment element, a first ring, and a second ring;
   wherein the first ring is drivable by the drive unit so as to be rotatable around a rotational axis and comprises a plurality of circumferentially distributed axial through-openings,
   wherein in each of the axial through-openings two rollers are arranged and are axially supported against one another and are in rolling contact with one another, of which a first roller is axially supported against the abutment element and a second roller is supported against the second ring;
   wherein the second ring is configured to be held rotationally fixed and axially movable in a stationary component and comprises a plurality of circumferentially distributed ramps which each cooperate with an associated second roller; and
   wherein the ramps are configured such that rotatingly driving the rotatingly drivable first ring by the drive unit effects an axial movement of the second ring relative to the first ring.

2. The actuator assembly of claim 1,
   wherein the ramps of the second ring are configured such that in a first end position the second ring is axially close to the first ring, and in a second end position the second ring is axially further away from the first ring.

3. The actuator assembly of claim 1,
   wherein the ramps of the second ring are configured such that an intermediate position is provided along the relative rotational path between the first end position and the second end position, such that the second ring is held in the intermediate position at a defined axial distance relative to the first ring.

4. The actuator assembly of claim 1,
   wherein the ramps of the second ring comprise a first portion with a first gradient and a second portion with a second gradient, wherein between the first portion and the second portion a deepened intermediate portion is provided which defines the intermediate position.

5. The actuator assembly of claim 1,
   wherein the first and the second rollers are in the form of cylindrical rollers which are arranged axially adjacent to one another, wherein the first roller is rotatable around a first roller axis, and the second roller is rotatable around a second roller axis, wherein the first and the second roller axis extend parallel relative to one another and radially relative to the rotational axis of the first ring.

6. The actuator assembly of claim 1,
   wherein the ramps comprise planar ramp faces against which the second rollers are respectively axially supported and in rolling contact therewith.

7. The actuator assembly of claim 1,
   wherein the first and the second rollers are each arranged with play in the through-openings, or at least one of the first and the second rollers is supported in the associated through-opening by a bearing so as to be rotatable around the roller axis.

8. The actuator assembly of claim 1,
   wherein the ramps of the second ring extend less than 120 degrees in the circumferential direction.

9. The actuator assembly of claim 1,
   wherein the first ring, on a side facing the abutment element, comprises a planar radial face relative to which the first rollers project axially in the mounted condition, and
   the first ring, on a side facing the second ring, comprises a plurality of axial projections in each of which one of the through-openings is provided.

10. The actuator assembly of claim 1,
    wherein the second ring comprises anti-rotation elements for holding the second ring rotationally fixed, and axially movable, in the stationary component.

11. The actuator assembly of claim 1,
    wherein the drive unit comprises a controllable drive source and a force transmitting device for transmitting a force generated by the driving source to the ramp unit, wherein the force transmitting device comprises a driving pinion rotatably drivable by the drive source and a toothing firmly connected to the first ring, which toothing engages the driving pinion.

12. The actuator assembly of claim 1,
    wherein a spring element is provided which axially loads the second ring towards the first ring.

13. A clutch assembly for a driveline of a motor vehicle comprising:
    a disconnect clutch for disconnecting the driveline; and
    an actuator assembly for operating the disconnect clutch;
    wherein the actuator assembly comprises a drive unit for generating an operating force and a ramp unit which is drivable by the drive unit and which comprises an abutment element, a first ring and a second ring;
    wherein the first ring is drivable by the drive unit so as to be rotatable around a rotational axis and comprises a plurality of circumferentially distributed axial through-openings;
    wherein in each of the axial through-openings two rollers are arranged which are axially supported against one another and are in rolling contact with one another, of which a first roller is axially supported against the abutment element and a second roller is supported against the second ring;
    wherein the second ring is configured to be held rotationally fixed and axially movable in a stationary component and comprises a plurality of circumferentially distributed ramps which each cooperate with an associated second roller;
    wherein the ramps are configured such that rotatingly driving the rotatingly drivable first ring by the drive unit effects an axial movement of the second ring relative to the first ring;
    wherein the disconnect clutch comprises at least a first clutch part and a second clutch part, wherein a spring element is provided which loads the disconnect clutch in a closed position in which torque is transmittable between the first clutch part and the second clutch part;

wherein the ramp unit is arranged to load the disconnect clutch in an open position; and wherein the second ring cooperates with one of the first and the second clutch parts for disengaging the first and second clutch parts from each other when the drive unit is operated.

14. The clutch assembly of claim 13, wherein the ramps of the second ring are configured such that in the first end position the second ring is axially approached to the first ring, wherein the disconnect clutch is in the closed position, and in the second end position the second ring is axially further away from the first ring, wherein the disconnect clutch is in the open position.

15. The clutch assembly of claim 13, wherein a brake device is provided for braking one of the first and the second clutch part, wherein the brake device is operable by the drive unit via the ramp assembly.

16. The clutch assembly of claim 13, wherein the disconnect clutch is configured as a form-locking clutch, wherein the first clutch part and the second clutch part, in the closed position, form-lockingly engage one another and, in the open position, are uncoupled so that the first clutch part and the second clutch part are rotatable relative to one another;

wherein the ramp unit is effectively connected to one of the first and the second clutch part such that the first and the second clutch part are moved away from one other when the ramp unit is operated by the drive unit.

* * * * *